United States Patent
Akita et al.

(10) Patent No.: US 8,761,678 B2
(45) Date of Patent: Jun. 24, 2014

(54) RADIO TRANSMITTING METHOD AND APPARATUS, AND RADIO RECEIVING METHOD AND APPARATUS

(75) Inventors: Koji Akita, Yokohama (JP); Noritaka Deguchi, Yokohama (JP); Ren Sakata, Yokohama (JP); Koichiro Ban, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1396 days.

(21) Appl. No.: 12/050,560

(22) Filed: Mar. 18, 2008

(65) Prior Publication Data

US 2008/0242233 A1 Oct. 2, 2008

(30) Foreign Application Priority Data

Mar. 27, 2007 (JP) .................................. 2007-081979

(51) Int. Cl.
*H04B 1/00* (2006.01)

(52) U.S. Cl.
USPC ........... 455/63.1; 455/68; 455/69; 455/562.1; 455/436; 455/67.11; 370/208; 370/210; 370/204; 370/203; 370/491; 375/267; 375/346; 375/260; 375/299; 375/130

(58) Field of Classification Search
USPC ............ 455/68, 436, 67.11, 69, 562.1, 452.2, 455/63.1, 101; 375/260, 299, 316, 267, 375/346; 370/395.31, 229, 479, 204, 319, 370/208
See application file for complete search history.

(56) References Cited

U.S. PATENT DOCUMENTS

| | | | | |
|---|---|---|---|---|
| 7,308,037 B2* | 12/2007 | Akita et al. | .................... | 375/267 |
| 7,420,915 B2* | 9/2008 | Murakami et al. | ............ | 370/204 |
| 7,477,636 B2* | 1/2009 | Khan et al. | ..................... | 370/347 |
| 7,680,124 B2* | 3/2010 | Li et al. | ..................... | 370/395.31 |
| 7,808,885 B2* | 10/2010 | Akita et al. | .................... | 370/208 |

(Continued)

FOREIGN PATENT DOCUMENTS

| | | |
|---|---|---|
| JP | 2006-5908 | 1/2006 |
| JP | 2006-25328 | 1/2006 |

(Continued)

OTHER PUBLICATIONS

"$3^{rd}$ Generation Partnership Project; Technical Specification Group Radio Access Network; Physical layer procedures (FDD)", 3GPP TS 25.214 v3. 12., Mar. 2003, pp. 1-52.

(Continued)

*Primary Examiner* — Edward F. Urban
*Assistant Examiner* — Ganiyu A Hanidu
(74) *Attorney, Agent, or Firm* — Oblon, Spivak, McClelland, Maier & Neustadt, L.L.P.

(57) ABSTRACT

A radio transmitting apparatus includes a storage unit configured to store a plurality of weight sequence sets, which are each assigned to a plurality of transmission blocks sectioned by time axes and frequency axes, by associating the plurality of weight sequence sets with the plurality of transmission blocks, a first selecting unit configured to select one transmission block from the plurality of transmission blocks, a second selecting unit configured to select one weight sequence from one weight sequence set assigned to the one transmission block signal, a converting unit configured to convert a data signal by using the one weight sequence to generate a converted signal, and a transmitting unit configured to transmit the converted signal by using the one transmission block.

15 Claims, 8 Drawing Sheets

(56) References Cited

U.S. PATENT DOCUMENTS

| | | | |
|---|---|---|---|
| 7,869,531 B2* | 1/2011 | Deguchi | 375/260 |
| 2002/0051430 A1* | 5/2002 | Kasami et al. | 370/319 |
| 2004/0165596 A1* | 8/2004 | Garcia et al. | 370/395.21 |
| 2004/0257979 A1* | 12/2004 | Ro et al. | 370/208 |
| 2005/0265477 A1* | 12/2005 | Takeda et al. | 375/299 |
| 2006/0270360 A1 | 11/2006 | Han et al. | |
| 2007/0041404 A1* | 2/2007 | Palanki et al. | 370/479 |
| 2007/0066305 A1* | 3/2007 | Deguchi | 455/436 |
| 2007/0127361 A1* | 6/2007 | Kasami et al. | 370/208 |
| 2007/0135052 A1* | 6/2007 | Park et al. | 455/63.1 |

FOREIGN PATENT DOCUMENTS

| | | |
|---|---|---|
| JP | 2007-19806 | 1/2007 |
| KR | 10-2006-0124088 | 12/2006 |
| WO | WO 02/082689 A2 | 10/2002 |

OTHER PUBLICATIONS

Junichi Sato, et al., "MC-CDMA Beam Forming Using Block Weight Control", Society Meeting Lecture Papers of The Institute of Electronics, Information and Communication Engineers, Sep. 7, 2005, p. 129.

* cited by examiner

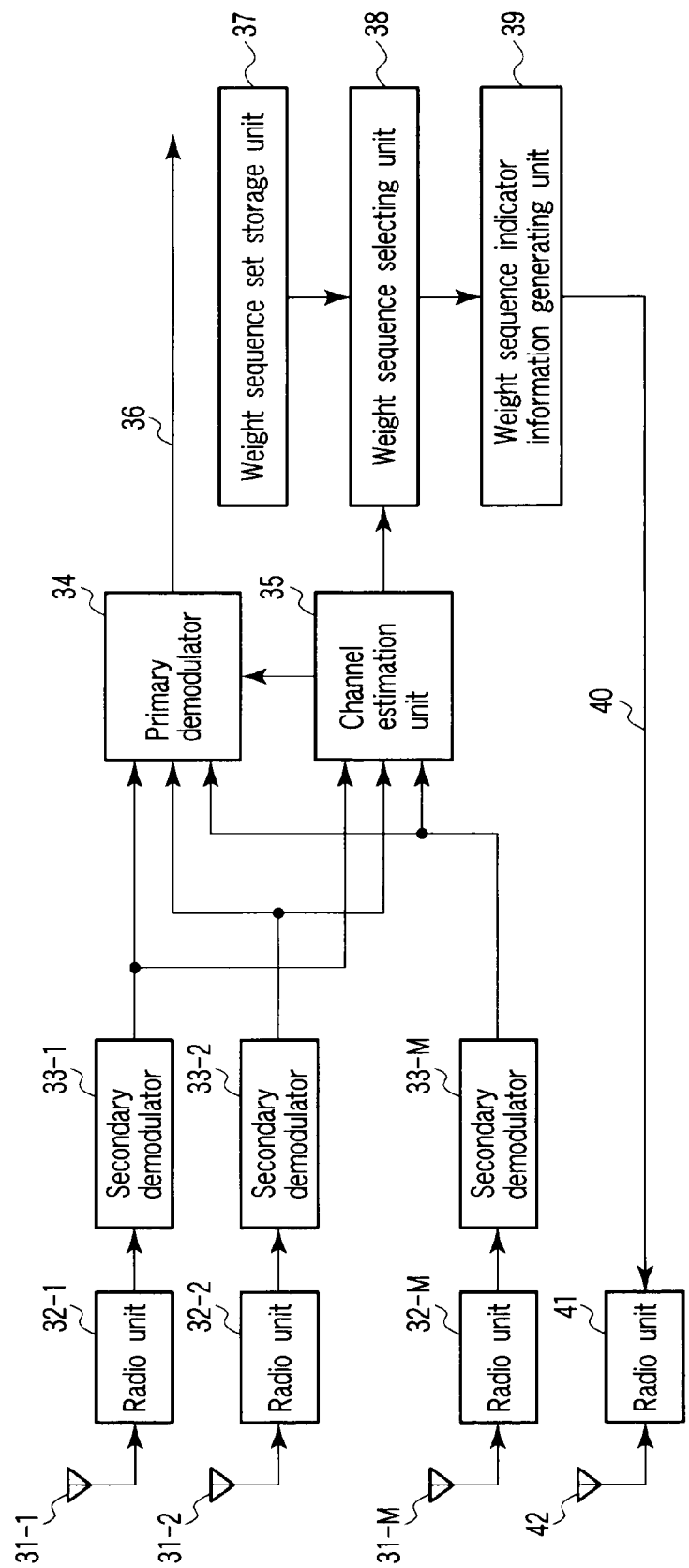
F I G. 3

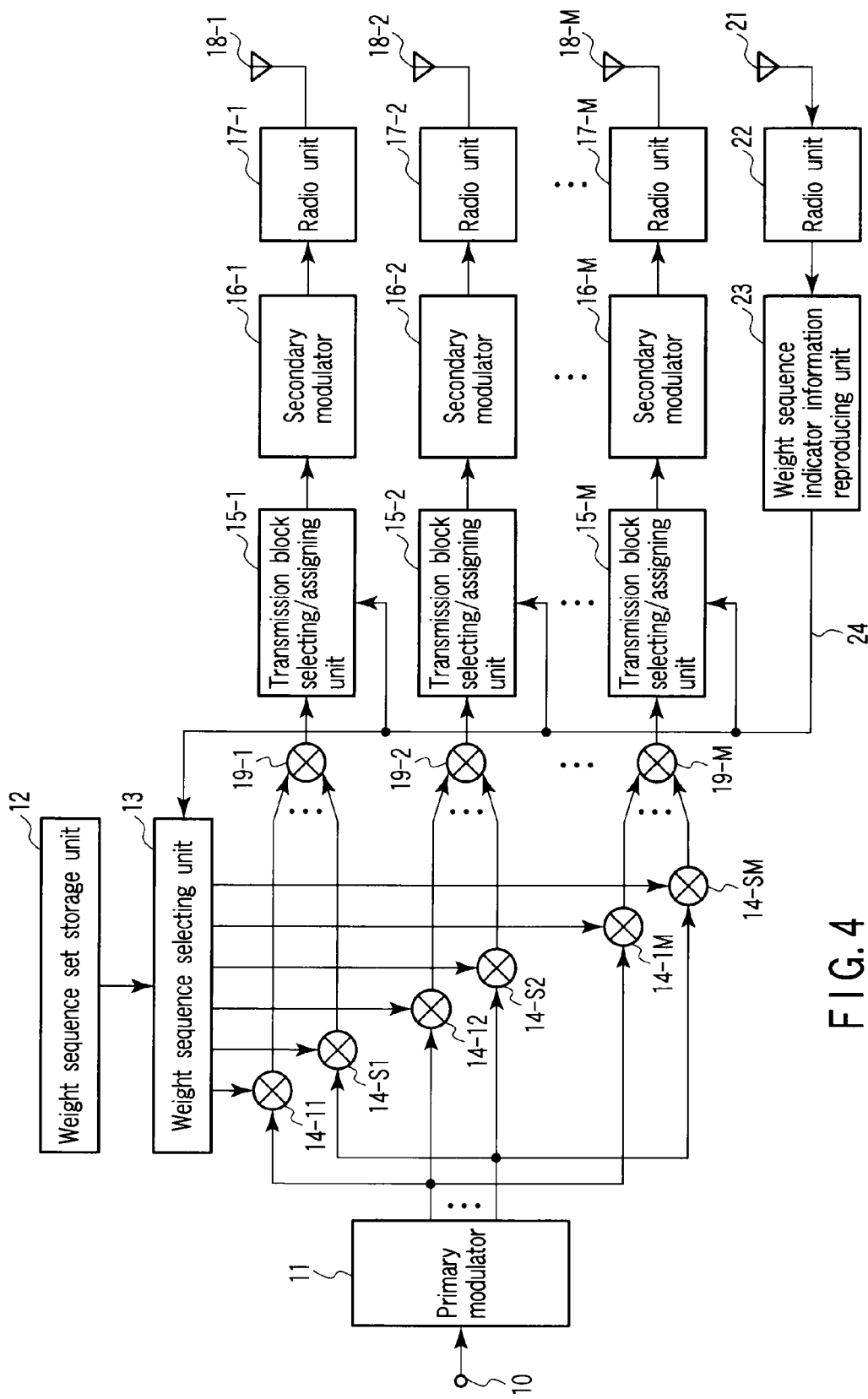
F I G. 4

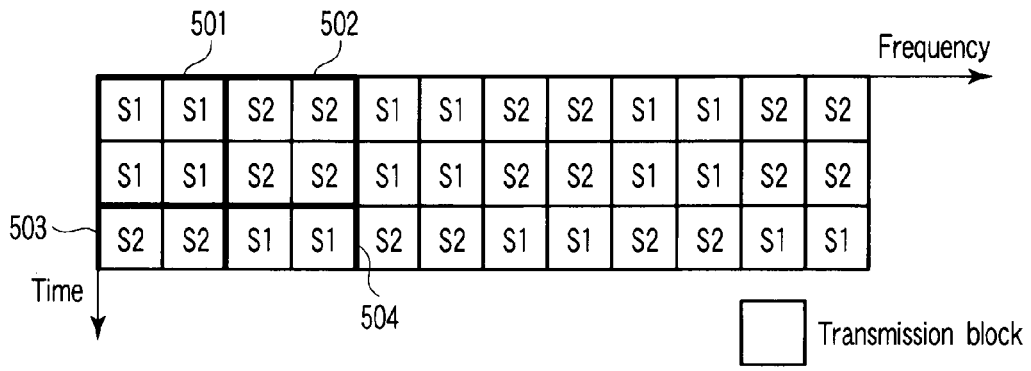
F I G. 11
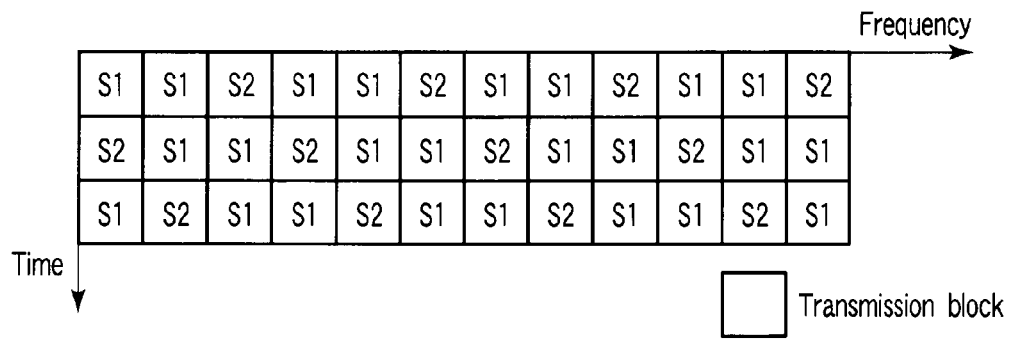
F I G. 12
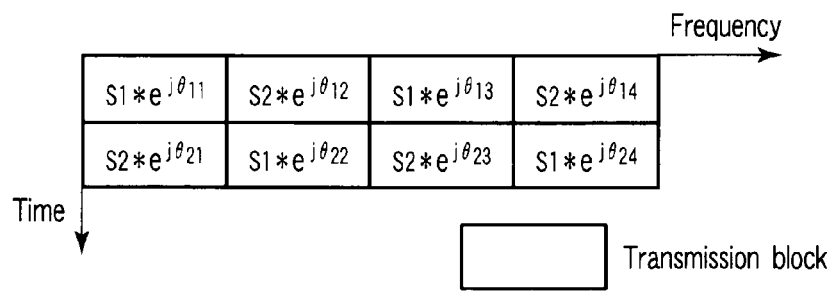
F I G. 13

RADIO TRANSMITTING METHOD AND APPARATUS, AND RADIO RECEIVING METHOD AND APPARATUS

CROSS-REFERENCE TO RELATED APPLICATIONS

This application is based upon and claims the benefit of priority from prior Japanese Patent Application No. 2007-081979, filed Mar. 27, 2007, the entire contents of which are incorporated herein by reference.

BACKGROUND OF THE INVENTION

1. Field of the Invention

The present invention relates to a radio transmitting method and an apparatus, and a radio receiving method and an apparatus in a radio communication system.

2. Description of the Related Art

A scheme, which improves receiving performance by multiplying a signal by a weight for each antenna in transmitting signals using a plurality of antennas, has been well known.

For instance, a scheme, which obtains desired gains by multiplying each signal to be transmitted from a transmission side by a weight so as to make a phase and an amplitude of the reception signal from each antenna equal to one another at a receiving end in transmitting the identical signals from a plurality of antennas, has been known. A scheme, which easily separates a plurality of signals by multiplying weights for adjusting phases and amplitudes on a transmission side so that signals overlapped with a plurality of channels at a receiving end easily become orthogonal to one another in transmitting a plurality of signals from a plurality of antennas, has been known. Generally, in these schemes, the finer the adjustment that can be applied to the weights, the higher the performance obtained.

In a system such as a time division duplex (TDD) system using the same frequency on an uplink and a downlink, the channels of the uplink and the downlink are almost same as each other. Therefore, for example, the TDD system may predict a channel from the signal to be received on the uplink and compute a weight sequence to be used on the downlink on the basis of the channel estimation result.

In contrast, in a system such as a frequency division duplex (FDD) using different frequencies on the uplink and the downlink, generally, the channels of the uplink and the downlink are different from each other. Therefore, for example, the FDD system may not compute a weight sequence to be used on the downlink from the signal to be received on the uplink on the basis of the channel estimation result. Accordingly, it is needed for the FDD system to compute a desired weight sequence by predicting the channel of the downlink on a reception side of the downlink and send weight sequence indicator information indicating the computed weight sequence to a transmission side through the uplink.

3GPP TS 25.214 v3.12.0 (2003-03), Mar. 26, 2003 (Document 1) prepares a plurality of kinds of weight sequences indicating the weight corresponding to each of two antennas. The plurality of kinds of weight sequences are called a weight sequence set. This weight sequence set is shared on both the transmission and reception sides. According to Document 1, on the reception side, one weight sequence is selected from the weight sequence set, and an index for the selected weight sequence is sent to the transmission side as weight sequence indicator information [called a feedback signaling message (FSM) in Document 1].

To finely adjust the weight and improve the receiving performance, it is needed to make the size of the weight sequence set larger. In sharing the weight sequence set by both the transmission and reception sides as disclosed in Document 1, when the size of the sequence set becomes large, such a problem of an increase in overhead of the weight sequence indicator information is produced.

BRIEF SUMMARY OF THE INVENTION

An object of the present invention is to improve the receiving performance without increasing the overhead of weight sequence indicator information.

According to one aspect of the invention, there is provided a radio transmitting apparatus comprising: a storage unit configured to store a plurality of weight sequence sets, which are each assigned to a plurality of transmission blocks sectioned by time axes and frequency axes, by associating the plurality of weight sequence sets with the plurality of transmission blocks; a first selecting unit configured to select one transmission block from the plurality of transmission blocks; a second selecting unit configured to select one weight sequence from one weight sequence set assigned to the one transmission block signal; a converting unit configured to convert a data signal by using the one weight sequence to generate a converted signal; and a transmitting unit configured to transmit the converted signal by using the one transmission block.

According to another aspect of the invention, there is provided a radio receiving apparatus comprising: a storage unit configured to store a plurality of weight sequence sets, which are each assigned to a plurality of transmission blocks sectioned by time axes and frequency axes, by associating the plurality of weight sequence sets with the transmission blocks; a selecting unit configured to select one weight sequence from one weight sequence set which is assigned to the transmission blocks for each transmission block; a transmitting unit configured to transmit indicator information indicating the one weight sequence; a receiving unit configured to receive a converted signal which is generated by converting a data signal by using the one weight sequence; and a reproducing unit configure to reproduce the data signal from the converted signal.

BRIEF DESCRIPTION OF THE SEVERAL VIEWS OF THE DRAWING

FIG. 3 is a block diagram depicting a radio receiving apparatus according to one embodiment;

FIG. 4 is a block diagram depicting a modified example of the radio transmitting apparatus;

FIG. 11 is a view depicting an example of assignment of the weight sequence set to the transmission block;

FIG. 12 is a view depicting an example of assignment of the weight sequence set to the transmission block;

FIG. 13 is a view depicting an example of assignment of a weight sequence set with phase rotation applied thereto to the transmission block.

DETAILED DESCRIPTION OF THE INVENTION

Hereinafter, embodiments of the present invention will be described with reference to the drawings.

(Radio Transmitting Apparatus)

Figure 1:
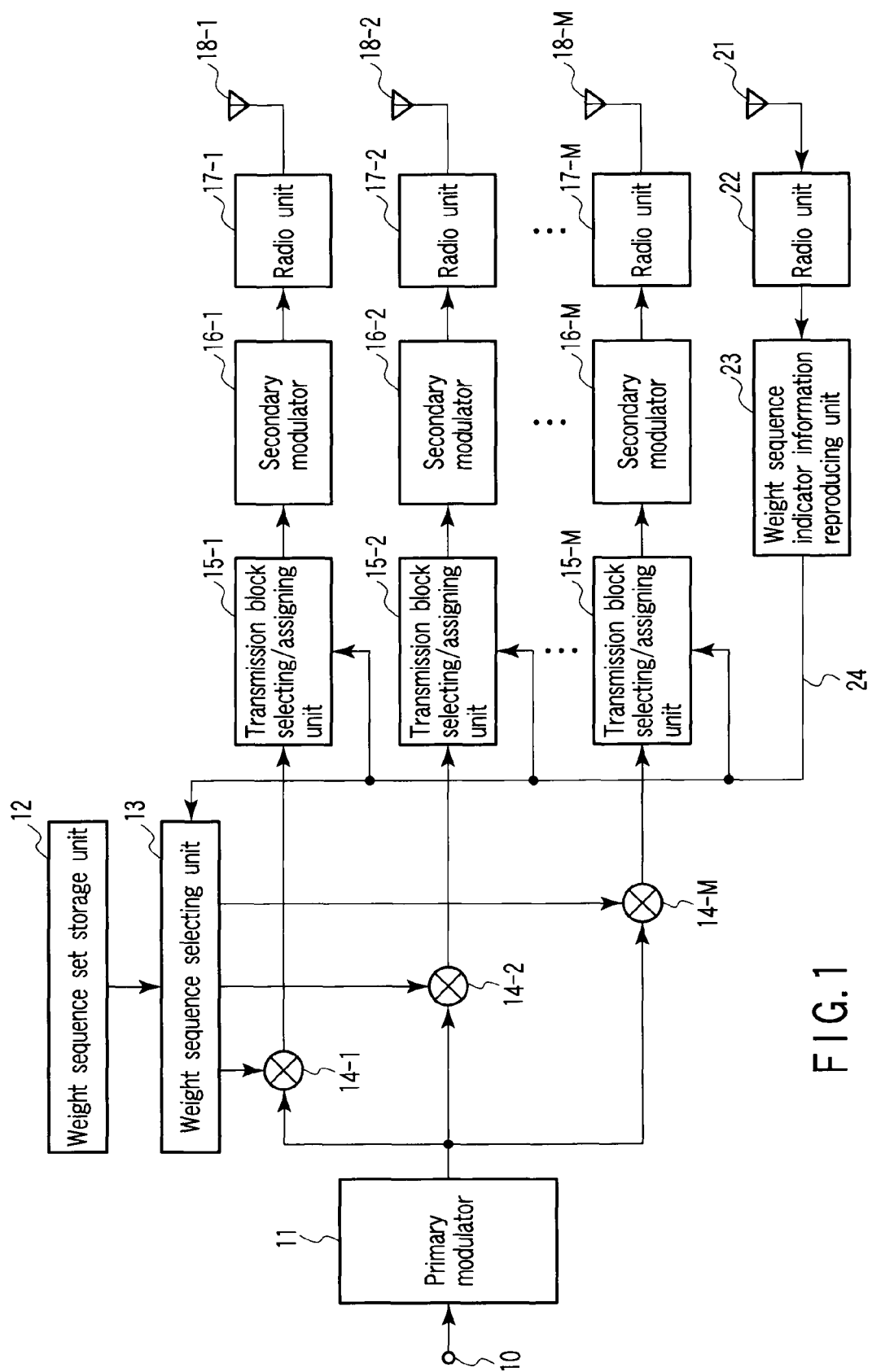
FIG. 1 is a block diagram depicting a radio transmitting apparatus according to one embodiment.

In a radio transmitting apparatus regarding one embodiment of the present invention, a primary modulator 11 modulates data to be input to an input terminal 10 and to be sent from the transmitting apparatus, and in this example, the radio transmitting apparatus generates one transmission base band signal, as shown in FIG. 1. In the primary modulator 11, various conventional well known digital modulation schemes, which include, for example, a modulation scheme such as binary phase shift keying (BPSK), quadrature phase shift keying (QPSK), amplitude shift keying (ASK), frequency shift keying (FSK), 16 quadrature amplitude modulation (16QAM), and 64 QAM, are utilized.

The transmission base band signals from the primary modulator 11 are input to multipliers 14-1 to 14-M of the same number as that of the number M of the below mentioned transmit antennas. A weight sequence set storage unit 12 each includes M weights, stores a plurality of weight sequences (referred to as a weight sequence set) each assigned to the below mentioned transmission blocks by associating the weight sequence sets with the transmission blocks, and, for example, a read-only memory (ROM) is used.

A weight sequence selecting unit 13 selects one weight sequence from the weight sequence sets stored in the storage unit 12. Each weight in the selected weight sequence is given to the multipliers 14-1 to 14-M, and is multiplied by the transmission base band signal from the primary modulator 11. Thereby, the transmission base band signals are weighted differently by the multipliers 14-1 to 14-M, respectively.

M transmission base band signals (converted signals) converted by weighting through the multipliers 14-1 to 14-M are input to transmission block selecting/assigning units 15-1 to 15-M. In the selecting/assigning units 15-1 to 15-M, each of one transmission blocks is selected from a plurality of blocks, as mentioned below, and further, is each assigned to the transmission base band signal with the selected transmission block input therein.

The transmission base bands with the transmission blocks assigned thereto are modulated by the secondary modulators 16-1 to 16-M in accordance with the assigned transmission blocks. In the secondary modulators 16-1 to 16-M, modulation schemes, which include, for example, code division multiple access (CDMA), orthogonal frequency division multiplexing (OFDM) and orthogonal frequency and code division multiplexing (OFCDM) combining the CDMA and OFDM, are utilized. The signals modulated by the secondary modulators 16-1 to 16-M are called multiplexing modulated signals.

The multiplexing modulated signals output from the secondary modulators 16-1 to 16-M are input to radio units 17-1 to 17-M. The radio units 17-1 to 17-M each have a frequency converter (up-converter), power amplifier and filter if necessary. The multiplexing modulated signals are up converted into frequencies in a radio frequency (RF) band in the radio units 17-1 to 17-M, and supplied to the transmit antennas 18-1 to 18-M to be transmitted, after the power amplification.

Meanwhile, a receive antenna 21 receives an RF signal to be transmitted from the below mentioned radio transmitting apparatus. The RF signal to be received by the receive antenna 21 is a signal in which an index indicating a weight sequence (weight sequence indicator information) to be selected by the selecting unit 13. The received RF signal output from the receive antenna 21 is amplified and down converted by a radio unit 22, and then, sent to a weight sequence indicator information reproducing unit 23 so as to reproduce weight sequence indicator information 24. The reproduced weight sequence indicator information 24 is sent to the selecting unit 13 and the selecting/assigning units 15-1 to 15-M.

(Transmission Block)

Figure 2:
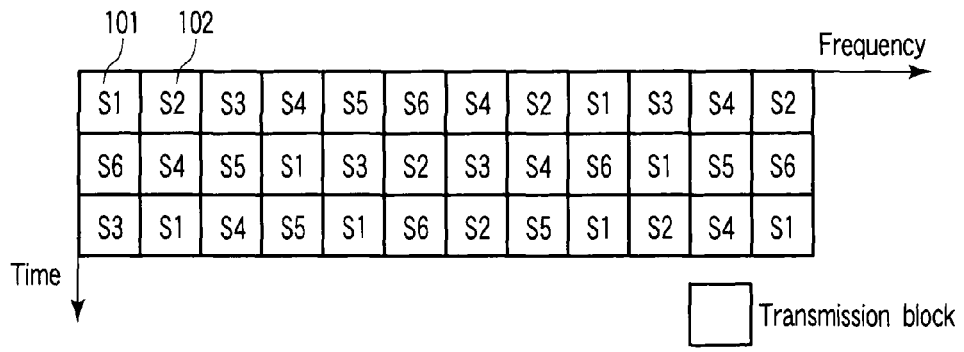
FIG. 2 is a block diagram depicting an example of assignment of a weight sequence set to a transmission block.

The following will describe the transmission block. The transmission block is a rectangular domain (time-frequency domain) which is sectioned by a time axis and a frequency axis, as shown in FIG. 2. According to this embodiment, the transmissions of data signals are performed in units corresponding to the transmission blocks. For instance, if each secondary modulator 16-1 to 16-M adopts a single carrier modulation scheme such as CDMA, time-frequency domains each sectioned by lengths of 'a' pieces of symbols in a time direction and of 'b' pieces of subcarriers in a frequency direction become the transmission blocks. Different transmission blocks are different in frequency and time to be used for transmissions. Therefore, the signal sent by each transmission block is generally sent through channels that are different in response.

Each user utilizing a radio communication system receives the signal sent by using some of a plurality of transmission blocks. Thereby, a transmission rate is in proportion to the number of transmission blocks which have been used for a certain time period. In other words, a user who needs a high transmission rate communicates by using a larger number of transmission blocks. In contrast, a user who can accept a low transmission rate communicates by using a smaller number of transmission blocks.

(Weight Sequence and Weight Sequence Set)

The following will describe the weight sequence and the weight sequence set. The weight sequence represents a sequence in which weights are lined up. For instance, if the number of the transmission base band signal is one and the number of the transmit antennas is M, one weight sequence p is expressed as the following formula (1) as a matrix of 1×M.

$$p = (w_1, w_2, \ldots, w_M) \quad (1)$$

In this case, a transmission base band signal to be transmitted from the m (1, 2, ..., M)-th antenna is multiplied by a weight Wm.

In contrast, if the number of the transmission base band signals is S, and the number of the transmit antennas is M, since the weights are defined for the base band signals and the antennas, respectively, the one weight sequence p is expressed as the following formula (2) as a matrix of S×M.

$$p = \begin{pmatrix} w_{11}, & w_{12}, & \cdots, & w_{1M}, \\ w_{21}, & w_{22}, & \cdots, & w_{2M}, \\ \vdots & \vdots & \ddots & \vdots \\ w_{S1}, & w_{S2}, & \cdots, & w_{SM} \end{pmatrix} \quad (2)$$

In this case, the transmission base band signals to be transmitted from the m (1, 2, ..., M)-th antenna are multiplied by a weight $W_{sm}$.

The weights that are elements of the weight sequence are, in a case of a single carrier system, represented, for example, by a constant of a complex number value. If there are a plurality of subcarriers in transmission blocks in a multicarrier system, the weights that are the elements of the weight sequence may be represented by the constant of the complex number values, similarly to the single carrier system, and also may be represented by a function w(f) related to a subcarrier number f.

The weight sequence set represents the weight sequences set given above. The size of the weight sequence set expresses the number of the sequences of the weight sequences included in the weight sequence set. As mentioned above, since the larger the size of the weight sequence set, the finer the adjustment of the weights may be performed, the receiving performance may be improved, but on the other hand, the overhead of the weight sequence indicator information is increased.

The fact that two weight sequence sets are the same as each other means that the sizes of the two weight sequence sets are the same as each other and also all the weight sequences included in each set are the same as one another. The fact that the two weight sequence sets are different from each other means that the sizes of the two weight sequence sets are different from each other or some of the weight sequences included in each set are different from one another.

Further, a weight sequence set expresses a set of a weight sequences to be used in a certain transmission block. For instance, if weight sequences P1 and P2 are used in a first transmission block, and weight sequences P3 and P4 are used in a second transmission block, the weight sequence sets for use in the first transmission block are (P1, P2), and the weight sequence sets for use in the second transmission block are (P3, P4).

(Radio Receiving Apparatus)

The following will describe the radio receiving apparatus corresponding to the radio transmitting apparatus illustrated in FIG. 1 by referring to FIG. 3. In the radio receiving apparatus, the RF signals to be sent from the transmitting apparatus are received by receive antennas 31-1 to 31-M, as illustrated in FIG. 3. The received RF signals output from the receive antennas 31-1 to 31-M are amplified by radio units 32-1 to 32-M, are down-converted, and then, reception base band signals are generated.

The reception base band signals output from the radio units 14-1 to 14-M are demodulated by secondary demodulators 33-1 to 33-M corresponding to the secondary modulators 16-1 to 16-M depicted in FIG. 1, respectively. The output signals from the secondary demodulators 33-1 to 33-M are input to a primary demodulator 34 and a channel estimation unit 35 corresponding to the primary modulator 11 shown in FIG. 1. The estimation unit 35 performs estimation processing of responses on channels, namely channel estimation, from the transmitting apparatus to the receiving apparatus to generate channel estimation values.

The demodulator 34 has a channel equalization unit built-in, and performs channel equalization for the output signals from the modulators 33-1 to 33-M by using the channel estimation values from the estimation unit 35. After this, the demodulator 34 performs demodulation processing on the channel-equalized signals to reproduce a data signal 36.

The radio receiving apparatus further includes a weight sequence set storage unit 37, a weight sequence selecting unit 38 and a weight sequence indicator information generating unit 39. The storage unit 37 stores M weights by associating a plurality of weight sequences (weight sequence set) each including the M weights with the transmission blocks, similarly to the storage unit 12 depicted in FIG. 1. The selecting unit 38 selects one weight sequence from the weight sequence set stored in the storage unit 37 on the basis of the channel estimation value from the estimation unit 35.

The generating unit 39 generates channel sequence indicator information, which is an index for indicating the channel sequence selected by the selecting unit 38. The indicator information is up-converted into the frequency in an RF band by a radio unit 41; furthermore, after the power amplification, the indicator information is supplied to a transmit antenna 42, and then, transmitted toward the radio transmitting apparatus in FIG. 1.

(Modified Example of Radio Transmitting Apparatus)

The radio transmitting apparatus illustrated in FIG. 4 is an example in the case that a plurality of transmission basebands (S) are output from the primary modulator 11, and S×M multipliers 14-11 to 14-S1, 14-12 to 14-S2, ..., 14-1M to 14-SM are disposed in accordance with the M transmit antennas 18-1 to 18-M.

The selecting unit 13 selects one weight sequence from the weight sequence sets stored in the storage unit 12. Each weight of the selected one weight sequence is given to the multipliers 14-11 to 14-M, each weight of the second weight sequence is given to the multipliers 14-11 to 14-S1, 14-12 to 14-S2, ..., 14-1M to 14-SM, multiplied by the S transmission baseband signals from the primary modulator 11, and then, different weighting is performed for each of the M antennas by being multiplied by the S transmission base band signals from the modulator 11.

Like this, the M transmission baseband signals converted by being weighted by the multipliers 14-11 to 14-S1, 14-12 to 14-S2, ..., 14-1M to 14-SM are transmitted from the transmit antennas 18-1 to 18-M through the transmission block selecting/assigning units 15-1 to 15-M, the secondary modulators 16-1 to 16-M and the radio units 17-1 to 17-M, similar to the case in FIG. 1. The receive antenna 21, the radio unit 22 and the weight sequence indicator information reproducing unit 23 are similar to those in FIG. 1.

The radio transmitting apparatuses shown in FIG. 1 or FIG. 4 transmits the base band signals through the procedures as follows:

(a) Assigns one weight sequence set selected from a plurality of weight sequence sets to a plurality of transmission blocks sectioned by time axes and frequency axes, respectively (b) Selects one transmission block from the plurality of transmission blocks (c) Selects one weight sequence from the one weight sequence set assigned to the one transmission block (d) Generates a converted signal by converting the data signal by the use of the one weight sequence (e) Transmits the converted signal by using the one transmission block.

Like this, selecting a weight sequence among different weight sequence sets for each transmission block and converting the signals to be transmitted enables actualizing the same receiving performance as that in the case of selection of the weight sequence among the weight sequences of which the sizes are larger than that of the weight sequence set in use for each transmission block.

For instance, in the example depicted in FIG. 2, six kinds of weight sequence sets; S1, S2, S3, S4, S5 and S6, are assigned to each transmission block. For instance, the weight sequence set S1 is assigned to a transmission block 101, and the weight sequence set S2 is assigned to a transmission block 102. Generally, a correlation of channels corresponding to the transmission block (correlation of channel response) is relatively high between two transmission blocks adjacent to each other in a frequency direction or a time direction. In the example of FIG. 2, since the transmission blocks 101 and 102 are arranged adjacent to each other, the correlation of the channels corresponding to each of the blocks 101, 102 is relatively high.

If the channels corresponding to both the transmission blocks 101, 102 are the same as each other, it is assumed that an optimum weight sequence is selected from the weight sequence set S1 assigned to the transmission block 101 and an optimum weight sequence is selected from the weight sequence set assigned to the transmission block 102. In this case, any one of the weight sequences selected from the weight sequence sets S1, S2 becomes equal to the optimum weight sequence selected from a set in which the weight sequence sets S1, S2 are combined for a certain one channel.

That is, in at least one of the transmission blocks 101, 102, the receiving performance, which is equivalent to the performance obtained when a weight sequence is selected from the set of the size made by putting together the weight sequence set S1 with the weight sequence set S2, may be realized. Like this, changing the weight sequence set, which is an object for selecting the weight sequence, enables achieving the receiving performance equivalent to the case in which the size of the weight sequence set is made larger, without having to change the size of the weight sequence set. Thereby, the receiving performance is improved while avoiding an increase in the overhead of the weight sequence indicator information.

(Processing Flow of Radio Transmitting Apparatus and Radio Receiving Apparatus)

Figure 5:
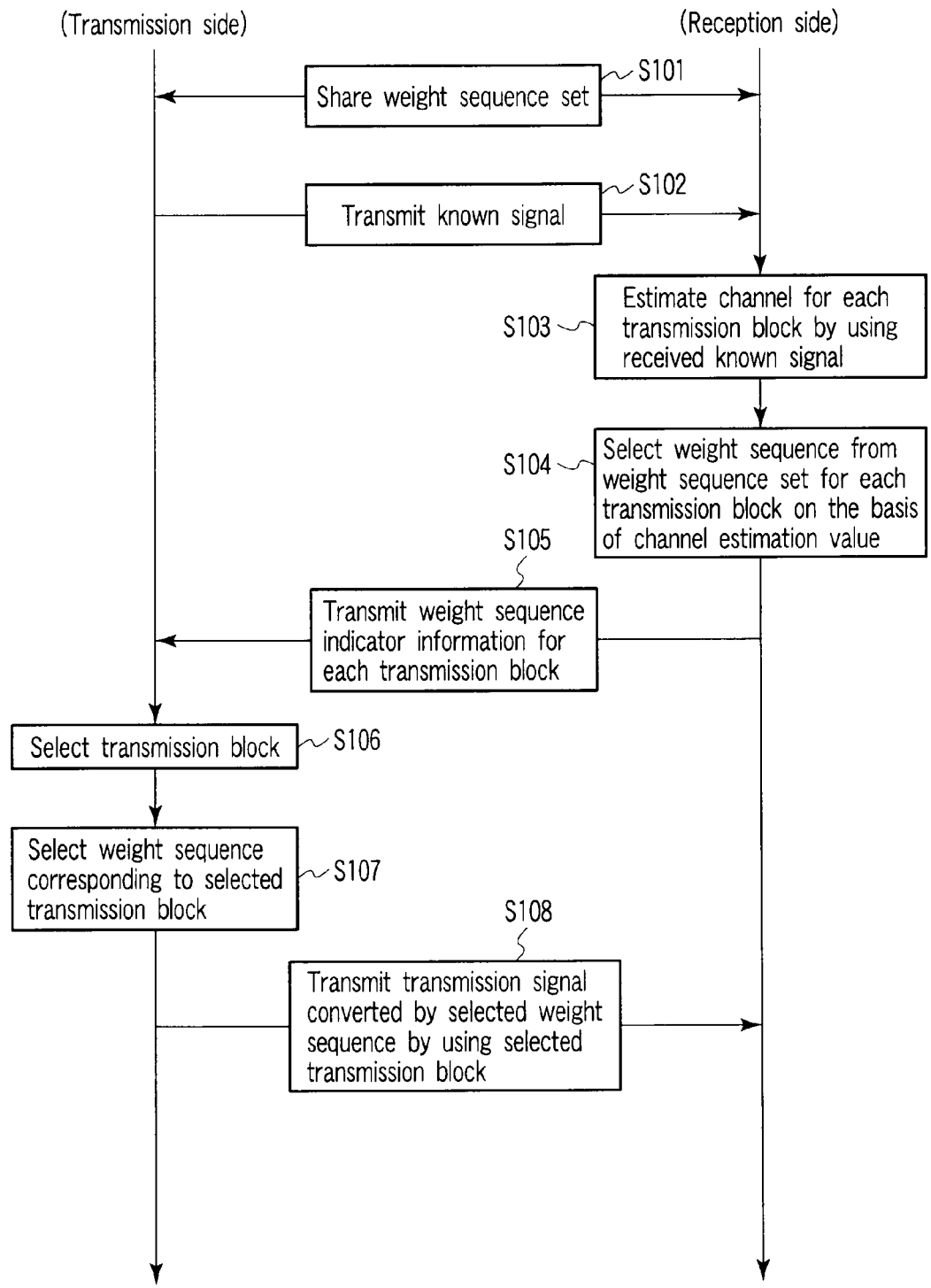
FIG. 5 is a view depicting a flow of processing of the radio transmitting apparatus and the radio receiving apparatus.

The flow of the processing of the radio transmitting apparatus shown in FIG. 1 or FIG. 4 and the flow of the processing of the radio receiving apparatus shown in FIG. 3 will be described by referring to FIG. 5. In FIG. 5, the radio transmitting apparatus is described as a transmission side, and the radio receiving apparatus is described as a reception side.

The both sides firstly share the weight sequence set for each transmission block (Step S101). More specifically, this case is equivalent to preparing identical weight sequence sets in the storage unit 12 in the radio transmitting apparatus and the storage unit 37 in the radio receiving apparatus and storing the sets by associating them with each transmission block.

However, the radio communication system may have already known the weight sequence sets, and in such a case, the processing in Step S101 may be omitted. If the weight sequence set has not been already known, since it is needed to any one of the transmission side and the reception side to notify the weight sequence sets to the other, Step S101 is required.

The transmission side sends a known signal to predict a channel (Step S102). The reception side estimates a channel for each transmission block by using the received known signal (Step S103). Since the scheme for predicting the channel with the use of the known signal has been widely known, here its explanation will be omitted.

The reception side selects one weight sequence from the weight sequence set corresponding to the transmission block for each transmission block on the basis of the channel estimation value obtained in Step S103 (Step S104).

The reception side transmits the weight sequence indicator information, which is an index indicating the weight sequence selected for each transmission block, to the transmission side (Step S105). In Step S105, the reception side may transmit, for example, the weight sequence indicator information corresponding only to some transmission blocks of which the channel qualities are relatively high. In Step S105, the reception side may transmit the information showing the quality of the channel (channel quality information) corresponding to each transmission block together with the weight sequence indicator information.

The transmission side selects one transmission block (Step S106). The weight sequence set is assigned to each transmission block, and one weight sequence is selected from the weight sequence set corresponding to each transmission block. Therefore, as a result, since the weight sequence indicator information is associated with the transmission block, the transmission side may select the one transmission block in accordance with the weight sequence information in Step S106.

For instance, if the reception side transmits the weight sequence indicator information corresponding only to some transmission blocks (generally, a plurality of transmission blocks) which are relatively high in channel quality in Step 105, the transmission side selects one transmission block among some transmission blocks corresponding to the weight sequence indicator information in Step S106. Thereby, the transmission side selects the transmission block which is excellent in channel state in Step S106.

If the reception side also transmits the channel quality information in Step S105, the transmission side selects one transmission block which is relatively high in quality (e.g., transmission block of which the channel quality is the highest) on the basis of the channel quality information in Step S106. Thereby, the transmission side also selects one transmission block with the channel which is excellent in channel state in Step S106.

The transmission side selects the weight sequence corresponding to the selected transmission block from the weight sequence set assigned to the transmission block selected in Step S106 (Step S107).

Finally, the transmission side assigns the transmission block selected in Step S106 to the signal converted with the use of the weight sequence selected in Step S107 and transmits the converted transmission signal by using the assigned transmission block (Step S108).

Like this, since the transmission signal converted in the same sequence as the weight sequence selected on the reception side in Step S107 is transmitted from the transmission side, the receiving performance may be improved.

As mentioned above, according to this embodiment, the kinds of the weight sequences which is selectable by the radio receiving apparatus without increasing the bit number of the weight sequence indicator information by changing the weight sequence sets to be selected. In other words, the radio communication system may improve the selection accuracy of the weight sequence without bringing with an increase in overhead of the indicator information caused by an increase in size of the weight sequence set and may obtain a high receiving performance.

As described with reference to FIG. 2, if the correlation among channels of the transmission blocks 101 or 102, in any one of the transmission blocks 101, 102, the receiving performance, which is equivalent to the case in which the weight sequence is selected from the weight sequence set of the size made by combining the weight sequence sets S1 and S2, may be achieved. Here, following the procedure to select the transmission block which is excellent in channel quality as shown in Steps S105, S106 in FIG. 5 enables selecting the transmission block with the optimum weight sequence set assigned thereto.

It is assumed that the channels corresponding to the transmission blocks 101 and 102 are the same as each other, and the weight that is optimum for the corresponding-channel is the second weight sequence included in the weight sequence set S2. In this case, for example, the reception side transmits only the weight sequence indicator information corresponding to the transmission block 102 to the transmission side. Or, the reception side transmits the indicator information by adding the channel quality information suggesting that the channel quality of the transmission block 101 is higher than that of the transmission block 102 to each item of the weight sequence indicator information. Thereby, the transmission block in which the optimum weight has been selected may be selected, and the receiving performance may be improved.

(Example of Assignment of Weight Sequence Set)

An example of assignment of the weight sequence sets to the transmission blocks will be described. The correlation between two weight sequence sets is taken into account. The fact that the correlation between the two weight sequence sets is relatively low means that the ratio including the weight sequences of weights with values which are close to each other is relatively small between the two weight sequence sets. For instance, it is assumed that the following four weight sequence sets to be expressed in the formulas (3) are given.

$$S_1 = \{(1, 1), (1, -1)\}$$
$$S_2 = \{(1, j), (1, -j)\}$$
$$S_3 = \{(1, 1), (1, j)\}$$
$$S_4 = \{(1, -1), (1, -j)\}$$
(3)

The sets S1 and S3 have the same weight sequences (1, 1); however the sets S1, S2 do not have the same weight sequences. Thereby, it is determined that the correlation between the sets S1 and S2 is lower than the correlation between the sets S1 and S3. For instance, it is assumed that the following three weight sequence sets to be expressed by the formulas (4) are given.

$$S_5 = \{(1, e^{0j\pi}), (1, e^{1j\pi})\}$$
$$S_6 = \{(1, e^{j\pi/2}), (1, e^{3j\pi/2})\}$$
$$S_7 = \{(1, e^{j\pi/4}), (1, e^{5j\pi/4})\}$$
(4)

It becomes clear that the difference between the first weight sequence $(1, e^{0/j\pi})$ of the set S5 and the first weight sequence $(1, e^{j\pi/4})$ of the set S7 is smaller than the difference between the first weight sequence $(1, e^{0/j\pi})$ of the set S5 and the first weight sequence $(1, e^{j\pi/2})$ of the set S6. In a similar manner, it becomes clear that the difference in the values between the second weight sequences of the sets S5, S7 is smaller than the difference in the values between the second weight sequences of the sets S5, S6. Thereby, it may be determined that the correlation between the sets S5 and S6 is smaller than the correlation between the sets S5 and S7.

To put a priority on the improvement in the receiving performance, it is desirable to assign the weight sequence sets with relatively low correlation among the transmission blocks adjacent to each other. As given above, generally, the correlation of channels corresponding to one another is high among the transmission blocks adjacent to each other. Therefore, assigning the same weight sequence sets to the transmission blocks which are adjacent to each other heightens the possibility of the same weight sequences being selected for the transmission blocks adjacent to each other, and does not maximize the effect. In contrast, if the weight sequence sets with relatively low correlation are assigned to the adjacent two transmission blocks, the performance, which is equivalent to the case where an optimum weight sequence is selected among two weight sequence sets S1, S2 to a certain channel, may be achieved.

Figure 6:
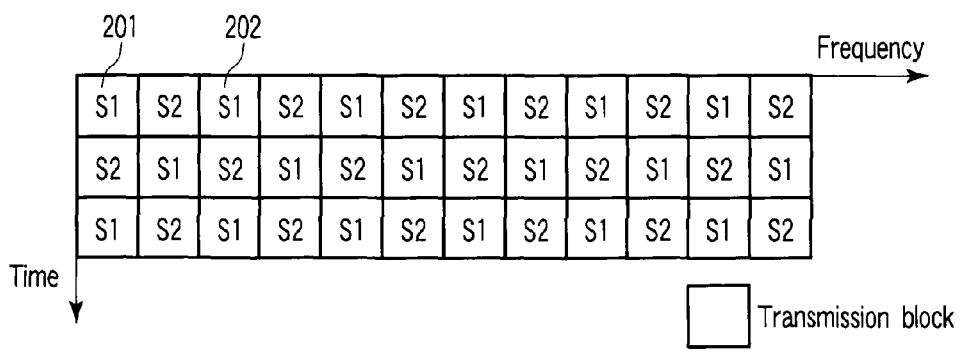
FIG. 6 is a view depicting an example of assignment of the weight sequence set to the transmission block.

For instance, if two weight sequence sets S1, S2 which are relatively low in correlation are assigned, the weight sequence sets S1, S2 may be assigned alternately to the transmission blocks arranged in a time direction as shown in FIG. 6, and the sets S1, S2 may be assigned alternately to the transmission blocks arranged in a frequency direction. Like this, the weight sequence sets which are relatively low in correlation may be assigned to the transmission blocks adjacent to each other in both the time and the frequency directions.

Figure 7:
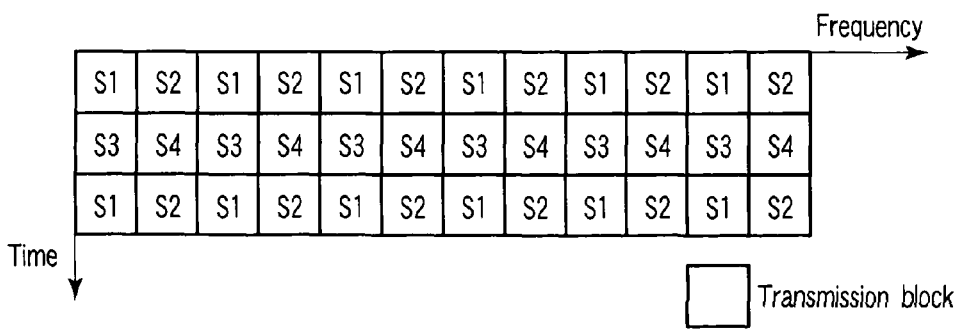
FIG. 7 is a view depicting an example of assignment of the weight sequence set to the transmission block.
Figure 8:
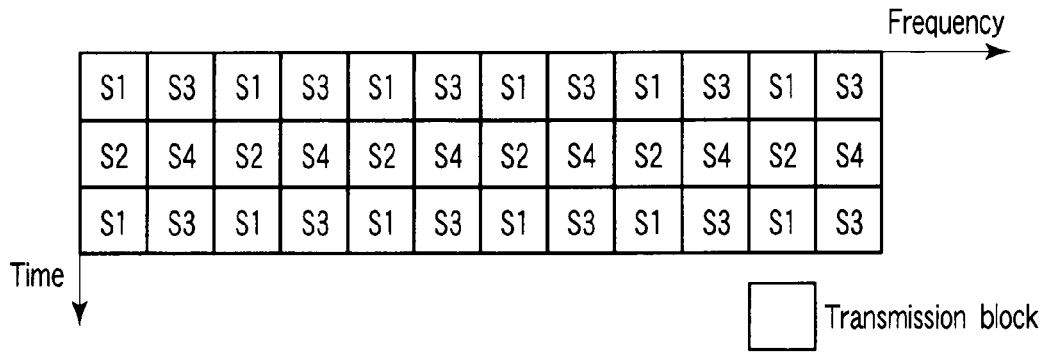
FIG. 8 is a view depicting an example of assignment of the weight sequence set to the transmission block.

For instance, if four weight sequence sets are assigned, the correlation between the first and the second weight sequence sets is relatively low, the correlation between the third and the fourth weight sequence sets is also relatively low, and the correlation among other weight sequence sets is not low (relatively high), and the weight sequence sets may be assigned to the transmission blocks as shown in FIGS. 7 and 8. In FIGS. 7 and 8, the correlation between the weight sequence sets S1 and S2, and the correlation between the weight sequence sets S3 and S4 are relatively low, the correlation among the weight sequence sets S1, S3 and S4, and the correlation among the weight sequence sets S2, S3 and S4 are not relatively low (relatively high).

In the example in FIG. 8, by alternately arranging the weight sequence sets S1 and S2 which are relatively low in correlation in the frequency direction, the receiving performance may be easily improved in the case of high correlation among the channels in the frequency direction. In the example in FIG. 9, by alternately arranging the weight sequence sets S and S2 which are relatively low in correlation in the frequency direction, the receiving performance may be easily improved in the case of high correlation among the channels in the time direction.

Figure 9:
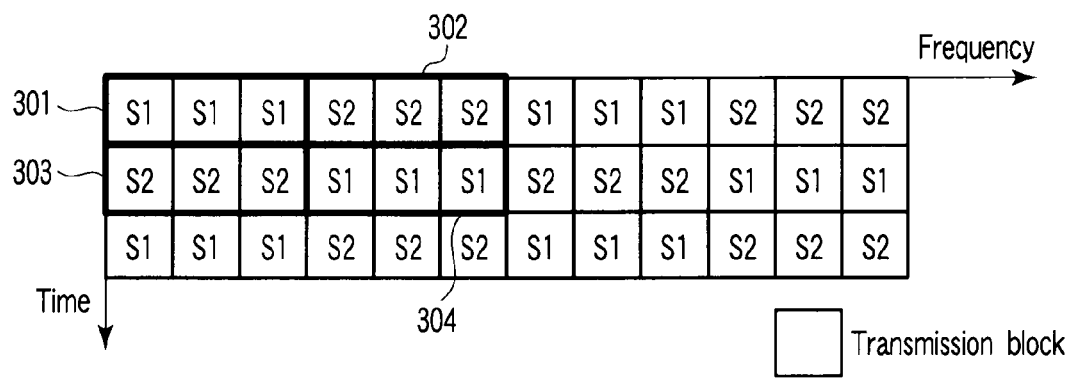
FIG. 9 is a view depicting an example of assignment of the weight sequence set to the transmission block.
Figure 10:
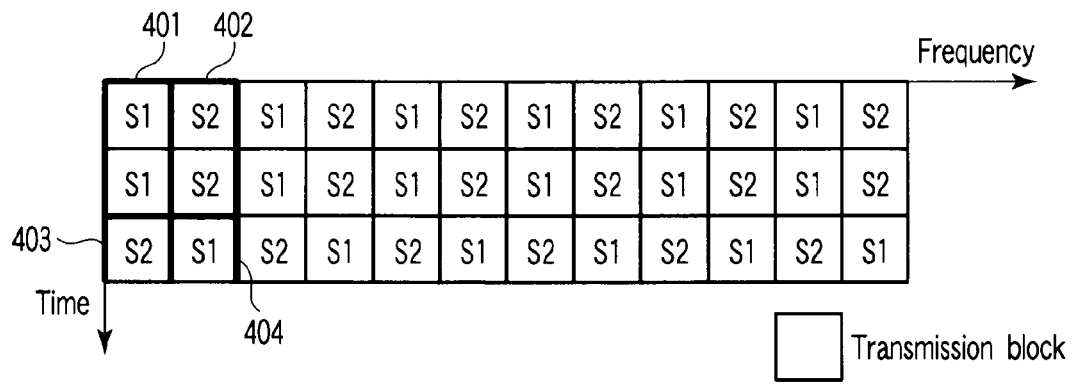
FIG. 10 is a view depicting an example of assignment of the weight sequence set to the transmission block.

In contrast, if a high priority is placed on reduction in overhead of the weight sequence indicator information, the same weight sequence sets may be assigned to a plurality of transmission blocks (referred to as an adjacent transmission block group) which are adjacent to each other in at least one direction of the frequency direction and the time direction, as illustrated in FIGS. 9, 10 and 11. As mentioned above, the correlation between adjacent transmission blocks is high. That is, if the same weight sequence sets are assigned to the adjacent transmission blocks, there is a high possibility that the optimum weight sequences will become the same as one another. Therefore, in such a case, if the same weight sequence sets are assigned to the adjacent transmission block groups, since one piece of weight sequence indicator information shared by the block groups may be used, the overhead caused from the weight sequence indicator information is reduced.

Like this, even when the same weight sequence sets are assigned to the adjacent-transmission block groups, it is preferable that the weight sequence sets of which the correlation are relatively low against the adjacent transmission block groups and the transmission blocks adjacent to the adjacent transmission block groups. Thereby, the receiving performance may be kept at some level.

An explanation will be given of an example in which two weight sequence sets, S1 and S2, of which the correlation is relatively low, are assigned. In the example of FIG. 9, three transmission blocks adjacent to each other in a frequency direction form one adjacent-transmission block group, the set S1 is assigned to a first adjacent transmission block group 301, and the set S2 is assigned to a second adjacent transmission block group 302 adjacent to the first block group 301 in the frequency direction. Further, the set S2 is assigned to a third adjacent transmission block group 303 adjacent to the first block group 301 in a time direction, and the set S1 is assigned to a fourth adjacent transmission block group 304 adjacent to the second block group 302 in the time direction. According to such an assignment scheme for weight sequence sets, when the channel correlation is high in the frequency direction, the overhead of the weight sequence indicator information may be efficiently reduced.

In the example of FIG. 10, one adjacent transmission block group is formed by two transmission blocks adjacent to each other in a time direction, the set S1 is assigned to a first adjacent transmission block group 401, and the set S2 is assigned to a second adjacent transmission block group 402 adjacent to the first block group 401 in a frequency direction. Further, the set S2 is assigned to a third adjacent transmission block group 403 adjacent to the first block group 401 in the time direction, and the set S1 is assigned to a fourth adjacent transmission block group 404 adjacent to the second block group 402 in the time direction. According to such an assignment scheme of a weight sequence set assignment scheme, when the channel correlation is high in the time direction, the overhead of the weight sequence indicator information may be efficiently reduced.

In the example of FIG. 11, four transmission blocks which are adjacent to each other in a frequency direction and a time direction form one adjacent transmission block group, the set S1 is assigned to a first adjacent transmission block group 501, and the set S2 is assigned to a second adjacent transmission block group 502 which is adjacent to the first block group 501 in the frequency direction. Further, the set S2 is assigned to a third adjacent transmission block group 503 which is adjacent to the first block group 501 in the time direction, and the set S1 is assigned to a fourth adjacent transmission block group 504 which is adjacent to the third adjacent transmission block group 403 and is also adjacent to the second block group 502 in the time direction. According to such an assignment scheme for weight sequence sets, when the channel correlation is high in the frequency direction and the time direction, the overhead of the weight sequence indicator information may be efficiently reduced.

FIG. 12 illustrates an example of another weight sequence set assignment. A plurality of weight sequence sets need not be always assigned to the transmission blocks in the same ratio. For instance, it is acceptable if two weight sequence sets S1, S2 having different characters from each other are prepared and the set S1 with the larger ratio is assigned to the transmission blocks, as shown in FIG. 12. In this case, making the size of the set S2 larger than that of the set S1 enables reducing the total amount of weight sequence indicator information.

On the contrary, making the size of the set S2 smaller than that of the set S1 enables increasing the ratio of the transmission blocks being controlled with high precision. Further, a case in which the weight sequences included in the sets S1 and S2 are each form transmission beams, or a case in which the receiving apparatuses belonging to the beams formed by the set S1 are large in number, enables improving the performance of a further larger number of receiving apparatuses.

(Transmission Scheme of Weight Sequence Indicator Information)

As described for FIG. 5, the reception side selects the one weight sequence from the weight sequence set for each transmission block (Step S104), and transmits the indicator information showing the selected weight sequence to the transmission side (Step S105). At this moment, transmitting only the indicator information showing the weight sequence assigned to some transmission blocks enables reducing the overhead of the indicator information.

If the channel correlation in each block of the transmission block groups with the same weight sequence sets assigned thereto, the reception side may select the weight sequence common to the transmission block groups and transmit the weight sequence indicator information corresponding to the transmission block groups. Thereby, the weight sequence indicator information may be further reduced.

For instance, in the example of the assignment of the weight sequence set shown in FIG. 9, if the correlation of the channels in the frequency direction is high, the reception side selects each weight sequence from the weight sequence set assigned to each adjacent transmission block group 301-304 to transmit the weight sequence instruct information. For instance, similarly to the example of the assignment of the weight sequence sets shown in FIG. 6, even in the case in which the transmission blocks with the same weight sequence sets assigned thereto are not adjacent each other, the reception side, for example, may select one weight sequence from the weight sequence set S1 which is assigned to the transmission blocks 201, 202 relatively adjacent to each other to transmit the weight sequence indicator information.

(Generation Scheme of Weight Sequence Set)

The following will describe an example of a weight sequence set that includes a plurality of second weight sequence sets which are used in the example of the foregoing assignment of the weight sequence sets, and are generated as weight sequence sets with relatively low correlation by applying the same phase rotation to a plurality of first weight sequence sets and to each weight of first weight sequences. Here, in the same manner as the previous definition, this example will be described by setting the number of the transmit antennas to M, and the number of the transmission base band signals to S. Further, the number of the weight sequence sets is represented by N, the number of the weight sequences included in one weight sequence set is represented by X, and the x-th weight sequence in the n-th weight sequence set is represented by $P_{n,x}$. For simplification of description, the following function is defined.

$$f(r) = e^{2\pi \times r} \tag{5}$$

This function expresses the phase rotation of $2\pi \times r$ deg. As understood from the definition, even when an arbitrary integer is added to r, or an arbitrary integer is subtracted from r, the function has the same value. The following formula (6) expresses this aspect.

$$f(r) = f(r+1) = f(r+2) = f(r-1) \tag{6}$$

The x-th weight sequence included in the n-th weight sequence set is created on the basis of phase rotation $f(r)=f[(n+N \times x)/(N \times x)]$. Creating the weight sequence on the basis of the phase rotation $f(r)$ makes a phase difference between weights included in the weight sequence come to $f(r)$. If the weight sequence set including the weight sequences to be created like this is created, since the weight sequences are created on the basis of different phase rotations among different weight sequence sets, the correlation among the weight sequence sets becomes low. The following will describe some examples.

For instance, in the case of N=2, M=2, S=1 and X=2, the weight sequence included in the first weight sequence set and the weight sequence included in the second weight sequence set are expressed by the following formulas (7), (8), respectively.

$$p_{1,1} = \{f(0), f((1+2 \cdot 1)/4)\} = \{+1, -j\}$$

$$p_{1,2} = \{f(0), f((1+2 \cdot 2)/4)\} = \{+1, +j\} \quad (7)$$

$$p_{2,1} = \{f(0), f((2+2 \cdot 1)/4)\} = \{+1, +1\}$$

$$p_{2,2} = \{f(0), f((2+2 \cdot 2)/4)\} = \{+1, -1\} \quad (8)$$

In the case of N=2, M=4, S=1 and X=2, the weight sequence included in the first weight sequence set, and the weight sequence include in the second weight sequence set are expressed by the following formulas (9) and (10), respectively.

$$\begin{aligned}
p1, 1 &= \{f(0), f((1+2 \cdot 1)/4)^1, f((1+2 \cdot 1)/4)^2, \\
&\quad f((1+2 \cdot 1)/4)^3\} \\
&= \{+1, -j, -1, +j\} \\
p1, 2 &= \{f(0), f((1+2 \cdot 2)/4)^1, f((1+2 \cdot 2)/4)^2, \\
&\quad f((1+2 \cdot 2)/4)^3\} \\
&= \{+1, j, -1, -j\}
\end{aligned} \quad (9)$$

$$\begin{aligned}
p2, 1 &= \{f(0), f((2+2 \cdot 1)/4)^1, f((2+2 \cdot 1)/4)^2, \\
&\quad f((2+2 \cdot 1)/4)^3\} \\
&= \{+1, +1, +1, +1\} \\
p2, 2 &= \{f(0), f((2+2 \cdot 2)/4)^1, f((2+2 \cdot 2)/4)^2, \\
&\quad f((2+2 \cdot 2)/4)^3\} \\
&= \{+1, -1, +1, -1\}
\end{aligned} \quad (10)$$

Furthermore, in the case of N=2, M=2, S=1 and X=4, the weight sequence included in the first weight sequence set, and the weight sequence include in the second weight sequence set are expressed by the following formulas (11), (12), respectively.

$$p_{1,1} = \{f(0), f((1+2 \cdot 1)/8)\} = \{f(0), f(3/8)\}$$

$$p_{1,2} = \{f(0), f((1+2 \cdot 2)/8)\} = \{f(0), f(5/8)\}$$

$$p_{1,3} = \{f(0), f((1+2 \cdot 3)/8)\} = \{f(0), f(7/8)\}$$

$$p_{1,4} = \{f(0), f((1+2 \cdot 4)/8)\} = \{f(0), f(1/8)\} \quad (11)$$

$$p_{2,1} = \{f(0), f((2+2 \cdot 1)/8)\} = \{f(0), f(4/8)\}$$

$$p_{2,2} = \{f(0), f((2+2 \cdot 2)/8)\} = \{f(0), f(6/8)\}$$

$$p_{2,3} = \{f(0), f((2+2 \cdot 3)/8)\} = \{f(0), f(0/8)\}$$

$$p_{2,4} = \{f(0), f((2+2 \cdot 4)/8)\} = \{f(0), f(2/8)\} \quad (12)$$

Like this, generating a plurality of weight sequence sets using different phase rotation amounts reduces the correlation among the weight sequence sets.

In the foregoing description, mutually interchanging 'n' indicating the weight sequence set number, or mutually interchanging 'x' indication the weight sequence number in a certain weight sequence set change does not change the effects substantially.

For instance, interchanging the first weight sequence set with the second weight sequence set changes only the indexes specifying each of the sets, and does not change the effects substantially. Interchanging the first weight sequence in the first weight sequence set with the second weight sequence therein achieves the same effects.

In the multipath fading environments, since the channels fluctuate in a frequency direction, even if common weight sequence sets are assigned to all the transmission blocks, since the alignment of the phases becomes different for each transmission block, diversity gain may be obtained. In contrast, in the case of flat fading, such diversity gain may not be obtained. Therefore, adding the phase rotation to the weight sequence set enables obtaining the diversity gain.

(Phase Rotation of Weight Sequence Set)

A scheme of applying the phase rotation to the weight sequence set will be described by referring to FIG. 13. Applying the phase rotation to the weight sequence set means applying the same phase rotation to all the weights in all the weight sequences included in the weight sequence set. For instance, applying a phase rotation of θ to the weight sequence set expressed by the following formula (13)

$$S_1 = \{(1,1), (1,-1)\} \quad (13)$$

means to convert the weight sequence set S1 in accordance with following formula (14)

$$S_1 \cdot e^{j\theta} = \{(e^{j\theta}, e^{j\theta}), (e^{j\theta}, -e^{j\theta})\} \quad (14)$$

If there exist two weight sequence sets S1, S2 with relatively low correlation therebetween, examples of assignment shown, for example, in FIGS. 6, 9, 10 and 11 may be useful. As mentioned above, for improving the receiving performance, it is desirable to assign weight sequence sets with low correlation therebetween for the transmission blocks of which the channel correlation is high. However, in a situation where the channel correlation is high in a wide range of time and frequency axes, it is hard to actualize such assignment with a small number of weight sequence sets.

For instance, in the example of the assignment of the weight sequence sets depicted in FIG. 6, if it is assumed that the channel correlation among four transmission blocks successive in the frequency direction, it is impossible to assign the weight sequence sets with relatively low correlation to the four transmission blocks only by two weight sequence sets. In contrast, by adding each phase rotation by a constant rotation amount to each weight of the weight sequences in the original two weight sequence sets S1, S2, as shown in FIG. 13, the correlation among the weight sequence sets may be lowered in comparison with the case of FIG. 6, and as a result, the receiving performance may be improved.

In this case, it is preferable for the difference in phase rotation amount of the weight sequence sets among the transmission blocks which are adjacent in the frequency direction to be constant. In this way, the reception side may decrease the number of bits of the indicator information in comparison with the case in which the phase rotation amount is set at random.

Further referring to FIG. 13, the weight sequence sets with the below mentioned phase rotations applied thereto are assigned to four transmission blocks adjacent to each other in the frequency direction. As regards four transmission blocks (from left to right, first, second, third and fourth transmission blocks) on an upper side in FIG. 13, in the weight sequence set assigned to the first transmission block, the phase rotation of $\theta_{11}$ is applied to the original set S1, in the weight sequence set assigned to the second transmission block, the phase rotation of $\theta_{12}$ is applied to the original set S2, in the weight sequence set assigned to the third transmission block, the phase rotation of $\theta_{13}$ is applied to the original set S1, and in the weight sequence set assigned to the fourth transmission block, the phase rotation of $\theta_{14}$ is applied to the original set S2.

Similarly, as regards the four transmission blocks (from left to right, fifth, sixth, seventh and eighth transmission blocks) on a lower side in FIG. 13, in the weight sequence set assigned to the fifth transmission block, the phase rotation of $\theta_{21}$ is applied to the set S2; in the weight sequence set assigned to the sixth transmission block, the phase rotation of $\theta_{22}$ is applied to the original set S1; in the weight sequence set assigned to the seventh transmission block, the phase rotation of $\theta_{23}$ is applied to the original set S2; and in the weight sequence set assigned to the eighth transmission block, the phase rotation of $\theta_{24}$ is applied to the original set S1.

Here, in one example, the phase rotations are selected as, $\theta_{11}=0°$ (without phase rotation), $\theta_{12}=10°$, $\theta_{13}=20°$, and $\theta_{14}=30°$, respectively. That is, in the weight sequence sets to be each assigned to each transmission block, the phase rotations of the same rotation amount are applied to each weight of each weight sequence in the sequence sets. The difference in phase rotation amount of the weight sequence sets assigned among the transmission blocks adjacent to each other in the frequency direction are constant (in this example, the difference is 10°).

In another example, the phase rotations are selected as, $\theta_{11}=0°$ (without phase rotation), $\theta_{12}=100°$, $\theta_{13}=20°$, $\theta_{14}=120°$, $\theta_{21}=180°$, $\theta_{22}=280°$, $\theta_{23}=200°$, and $\theta_{24}=210°$, respectively. Also in this example, in the weight sequence sets to be assigned to each transmission block, the phase rotations of the same rotation amount are applied to each weight of each weight sequence in the sequence sets. Further, the difference in phase rotation amount of the weight sequence sets assigned among the transmission blocks adjacent to each other in the time direction are constant (in this example, the difference is 180°).

Further more, in another example, the phase rotations are selected as, $\theta_{11}=0°$ (without phase rotation), $\theta_{12}=10°$, $\theta_{13}=20°$, $\theta_{14}=30°$, $\theta_{21}=180°$, $\theta_{22}=190°$, $\theta_{23}=200°$, and $\theta_{24}=210°$, respectively. Also in this example, in the weight sequence sets to be assigned to each transmission block, the phase rotations of the same rotation amount are applied to each weight of each weight sequence in the sequence sets. Further, the differences in phase rotation amount of the weight sequence sets assigned among the transmission blocks adjacent to each other in the frequency direction are constant (in this example, the difference is 10°), and the differences in phase rotation amount of the weight sequence sets assigned among the transmission blocks adjacent to each other in the time direction are constant (in this example, the difference is 180°).

(Flow of Processing of Radio Transmitting Apparatus and Radio Receiving Apparatus in the Case of Use of Phase Rotation)

Figure 14:
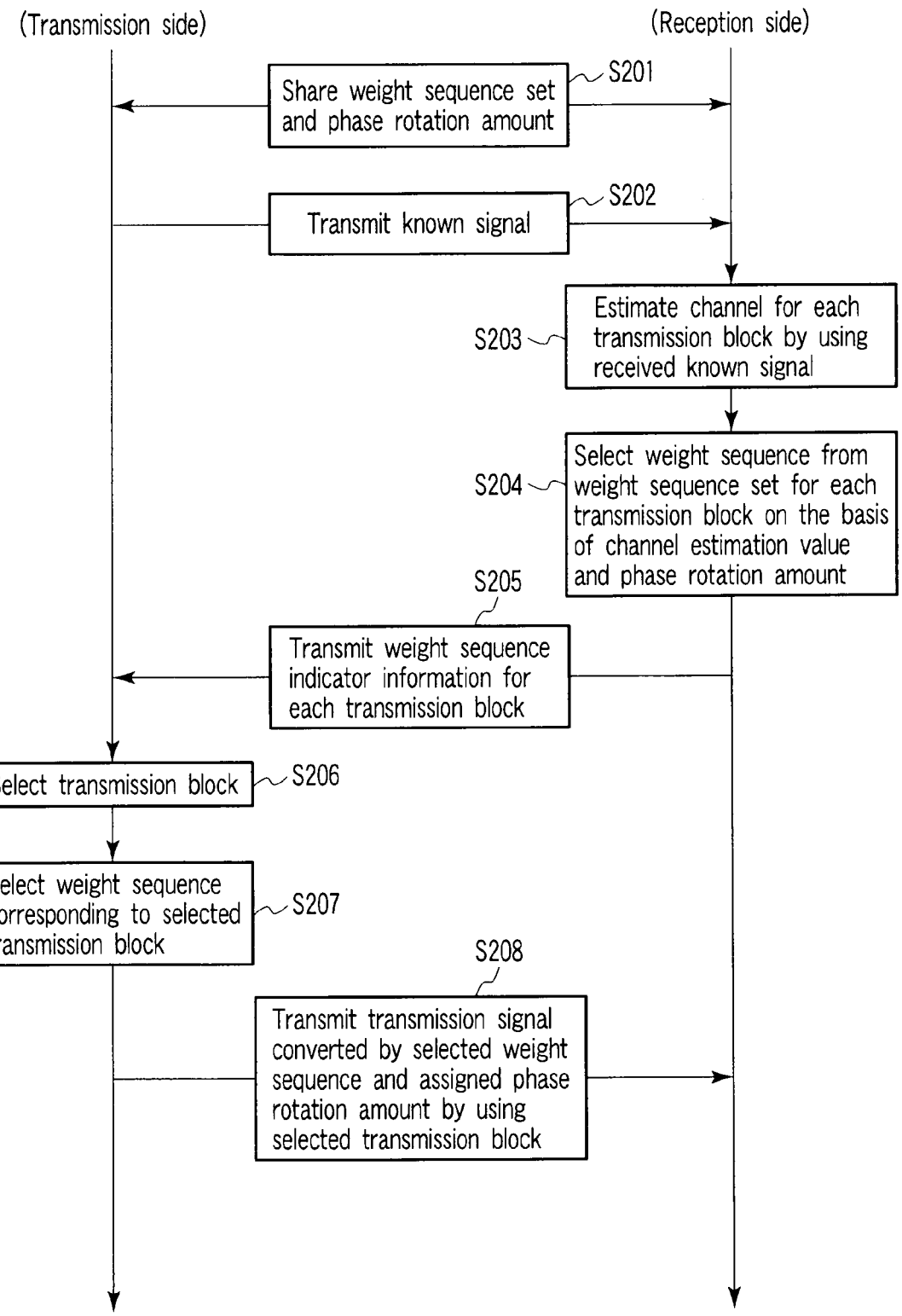
FIG. 14 is a view depicting a flow of processing of a radio transmitting apparatus and a radio receiving apparatus when the weight sequence set with the phase rotation applied thereto is used.

Flows in a radio transmitting apparatus shown in FIG. 1 or FIG. 4 and in a radio receiving apparatus shown in FIG. 3 in the case in which the phase rotations are applied to the weight sequence sets will be described with reference to FIG. 14. In FIG. 14, the radio transmitting apparatus is described as a transmission side, and the radio receiving apparatus is described as a reception side.

At first, both sides share the weight sequence sets and the phase rotation amounts (Step S201). This sharing is concretely equivalents to prepare weight sequence sets and phase rotation amounts which are equal to one another in the weight sequence set storage unit 12 in the radio transmitting apparatus and the weight sequence set storage unit 37 in the radio receiving apparatus, and stores the sets by associating the sets with each transmission block.

The phase rotation amounts may be independently set for each transmission block. A phase rotation amount, which is uniquely calculated in accordance with a distance of a time or a frequency from a certain reference transmission block up to a transmission block of an object of setting, may be set. According to the distance of the frequency, for example, a phase rotation expressed by a formula '$f\theta_F+t\theta_T$' is applied to the transmission block precedent by f pieces in a positive direction of a frequency from the reference transmission block up to the transmission block precedent by f pieces in a positive direction of a time. By setting the phase rotation amount like this, since it is sufficient to share only the information about the reference transmission block and the information showing the phase rotation amount, such as $\theta_F$ and $\theta_T$, the information to be shared may be reduced. If the radio communication system is previously aware about both the weight sequence set and the phase rotation amount, the processing in Step S201 may be omitted.

The transmission side then transmits the known signal to predict channels (Step S202). The reception side then estimates a channel for each transmission block by using the known signal received on the reception side (Step S203). The processing in Steps S202, S203 is similar to the processing in Steps S102, S103 shown in FIG. 5.

The reception side selects one weight sequence among the weight sequence sets corresponding to the transmission blocks for the respective transmission blocks, based on the channel estimation value and the phase rotation amount obtained in Step S203 (Step S204).

The reception side then transmits the weight sequence indicator information, which is an index indicating the weight sequence selected for each transmission block (Step S205). In Step S105, for example, the reception side may transmit the weight sequence indicator information corresponding only to some transmission blocks of which the channel qualities are relatively high. In Step S205, the reception side may transmit the information showing the channel quality (channel quality information) corresponding to each transmission block together with the weight sequence indicator information in Step S205.

The transmission side then selects a transmission block (Step S206). Since the weight sequence indicator information is associated with the transmission block, the transmission side selects one transmission block in accordance with the weight sequence information in Step S206.

For instance, in the case in which the weight sequence indicator information corresponding to only some transmission blocks of which the channel qualities are relatively high (in generally, a plurality of transmission blocks) in Step S205, the transmission side selects one transmission block among some transmission blocks corresponding to the weight sequence indicator information in Step S206. Thereby, the transmission side selects the transmission block which is excellent in channel state in Step S206.

In the case in which the channel quality information is transmitted together with the weight sequence indicator information in Step S205, the transmission side selects the transmission block of which the channel quality is relatively high on the basis of the channel quality information in Step S206. Thereby, the transmission side also selects the transmission block which is excellent in channel state in Step S206.

The transmission side selects the weight sequence corresponding to the selected transmission block from the weight sequence sets assigned to the transmission block selected in Step S206 in accordance with the weight sequence indicator information (Step S207).

Finally, the transmission side assigns the transmission block selected in Step S206 to the signal converted by using the weight sequence selected in Step S207 and by the assigned phase rotation amount, and transmits the converted signal by using the transmission block (Step S208).

Like this, since the transmission signal that is converted by the same weight sequence as the weight sequence selected on the reception side in Step S207 is transmitted from the transmission side, the receiving performance may be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio transmitting method comprising:
   assigning one weight sequence set selected from a plurality of weight sequence sets to a plurality of transmission blocks sectioned by time axis and frequency axis;
   selecting one transmission block from the plurality of transmission blocks;
   selecting one weight sequence from one weight sequence set assigned to the one transmission block, each weight sequence in the weight sequence set assigned to the one transmission block including more than one weight;
   modulating, in a radio transmitting apparatus, a data signal to generate a plurality of transmission baseband signals;
   converting the plurality of transmission baseband signals into a plurality of converted signals by multiplying each of the plurality of transmission baseband signals with a respective weight in the one weight sequence; and
   transmitting the converted signals by using the one transmission block.

2. The method according to claim 1, further comprising:
   receiving indicator information indicating the one weight sequence, wherein
   the one weight sequence is selected in accordance with the indicator information.

3. A radio transmitting apparatus comprising:
   a storage unit configured to store a plurality of weight sequence sets, which are each assigned to a plurality of transmission blocks sectioned by time axis and frequency axis, by associating the weight sequence sets with the plurality of transmission blocks;
   a first selecting unit configured to select one transmission block from the plurality of transmission blocks;
   a second selecting unit configured to select one weight sequence from one weight sequence set assigned to the one transmission block signal, the selected one weight sequence including more than one weight;
   a modulating unit configured to modulate a data signal into a plurality of transmission baseband signals;
   a converting unit configured to convert the plurality of transmission baseband signals into converted signals by multiplying each of the plurality of transmission baseband signals with a respective weight in the one weight sequence to generate a converted signal; and
   a transmitting unit configured to transmit the converted signals by using the one transmission block.

4. The apparatus according to claim 3, further comprising:
   a receiving unit configured to receive indicator information indicating the one weight sequence, wherein
   the second selecting unit is configured to select the one weight sequence in accordance with the indicator information.

5. The apparatus according to claim 3, further comprising:
   a receiving unit configured to receive indictor information indicating the one weight sequence, wherein
   the first selecting unit is configured to select the one transmission block in accordance with the indicator information, and
   the second selecting unit is configured to select the one weight sequence in accordance with the indicator information.

6. The apparatus according to claim 3, further comprising:
   a receiving unit configured to receive indicator information indicating the one weight sequence and quality information relating to a channel corresponding to the transmission block, wherein
   the first selecting unit is configured to select the one transmission block in accordance with the quality information, and
   the second selecting unit is configured to select the one weight sequence in accordance with the indicator information.

7. The apparatus according to claim 3, wherein
   the plurality of transmission blocks include a first transmission block and a second transmission block adjacent to each other in at least one of a frequency direction and a time direction, and
   the plurality of weight sequence sets include a first weight sequence set which is assigned to the first transmission block and a second weight sequence set which is assigned to the second transmission block and is different from the first weight sequence set.

8. The apparatus according to claim 3, wherein
   the transmission blocks include a first transmission block and a second transmission block which are adjacent to each other in at least one of a frequency direction and a time direction, and
   the weight sequence sets include a first weight sequence set which is assigned to the first transmission block and a second weight sequence set which is assigned to the second transmission block and is relatively small in correlation with the first weight sequence set.

9. The apparatus according to claim 3, wherein
   the transmission blocks include a first transmission block and a second transmission block which are adjacent to each other in at least one of a frequency direction and a time direction,
   the weight sequence sets include a first weight sequence set of a first weight sequences which are assigned to the first transmission block, and a second weight sequence set of a second weight sequences which are assigned to the second transmission block, the second weight sequences are different from the first weight sequences.

10. The apparatus according to claim 3, wherein
the plurality of transmission blocks include a first transmission block and a second transmission block which are adjacent to each other in at least one of a frequency direction and a time direction; and
the plurality of weight sequence sets include weight sequence sets which are assigned in common to the first transmission block and the second transmission block.

11. The apparatus according to claim 3, wherein
the plurality of weight sequence sets include a first weight sequence set which is assigned in common to the first transmission block group, and a second weight sequence set which is assigned to transmission blocks adjacent to the first transmission block group and of which the correlation with the first weight sequence set is relatively small.

12. The apparatus according to claim 3, wherein
the plurality of weight sequence sets include a plurality of second weight sequence sets which are generated by applying common phase rotations to each weight of a plurality of first weight sequences.

13. The apparatus according to claim 3, wherein the plurality of weight sequence sets are performed phase rotations and differences in the phase rotations between transmission blocks which are adjacent to each other in at least one of a frequency direction and a time direction among the plurality of transmission blocks are constant.

14. A radio receiving method comprising:
assigning one weight sequence set selected from a plurality of weight sequence sets to a plurality of transmission blocks sectioned by time axis and frequency axis;
selecting one weight sequence from the one weight sequence set which is assigned to the transmission block for each transmission block, the selected one weight sequence including more than one weight;
transmitting indicator information indicating the one weight sequence;
receiving, in a radio receiving apparatus, a converted signal which is generated by multiplying transmission baseband signals with corresponding weights in the one weight sequence; and
reproducing the data signal from the converted signal.

15. A radio receiving apparatus comprising:
a storage unit configured to store a plurality of weight sequence sets, which are each assigned to a plurality of transmission blocks sectioned by time axis and frequency axis, by associating the plurality of weight sequence sets with the transmission blocks;
a selecting unit configured to select one weight sequence from one weight sequence set which is assigned to the transmission blocks for each transmission block, the selected one weight sequence including more than one weight;
a transmitting unit configured to transmit indicator information indicating the one weight sequence;
a receiving unit configured to receive a converted signal which is generated by multiplying transmission baseband signals with corresponding weights in the one weight sequence; and
a reproducing unit configure to reproduce the data signal from the converted signal.

* * * * *